United States Patent
Jain et al.

(10) Patent No.: US 10,230,820 B2
(45) Date of Patent: Mar. 12, 2019

(54) ANALYTICS DRIVEN UPDATE NOTIFICATION

(71) Applicant: Wyse Technology L.L.C., Santa Clara, CA (US)

(72) Inventors: Shailesh Jain, Thane (IN); Vishal Kumar Singh, East Singhbum (IN)

(73) Assignee: Wyse Technology L.L.C., Santa Clara, CA (US)

( * ) Notice: Subject to any disclaimer, the term of this patent is extended or adjusted under 35 U.S.C. 154(b) by 75 days.

(21) Appl. No.: 15/485,480

(22) Filed: Apr. 12, 2017

(65) Prior Publication Data

US 2018/0302494 A1    Oct. 18, 2018

(51) Int. Cl.
G06F 9/44    (2018.01)
H04L 29/08   (2006.01)
G06F 8/65    (2018.01)
H04L 12/26   (2006.01)

(52) U.S. Cl.
CPC ........... H04L 67/34 (2013.01); G06F 8/65 (2013.01); H04L 43/103 (2013.01)

(58) Field of Classification Search
USPC ......................................... 717/173
See application file for complete search history.

(56) References Cited

U.S. PATENT DOCUMENTS

| | | | | |
|---|---|---|---|---|
| 9,674,265 B2* | 6/2017 | Agrawal | .......... | H04L 67/04 |
| 2004/0088701 A1* | 5/2004 | Hatalkar | .......... | G06F 9/44573 718/100 |
| 2005/0091651 A1* | 4/2005 | Curtis | .......... | G06F 8/65 717/168 |
| 2011/0107334 A1* | 5/2011 | Kapoor | .......... | G06F 9/4843 718/100 |
| 2013/0007662 A1* | 1/2013 | Bank | .......... | G06F 9/451 715/811 |
| 2013/0055271 A1* | 2/2013 | Yoo | .......... | G06F 13/22 718/102 |
| 2013/0290857 A1* | 10/2013 | Beveridge | .......... | G06F 3/0484 715/740 |
| 2014/0250439 A1* | 9/2014 | Parashar | .......... | G06F 9/5083 718/104 |

(Continued)

OTHER PUBLICATIONS

Dynatrace, "Collecting and Analyzing Execution-Time Data", 2017, publsihed at https://www.dynatace.com/resources/ebooks/javabook/collecting-execution-time-data/.*

(Continued)

Primary Examiner — Hossain M Morshed
(74) Attorney, Agent, or Firm — Kirton McConkie; Brian Tucker

(57) ABSTRACT

Analytics driven update notifications can be provided. An agent on a managed device can monitor which applications are being used on the managed device and can provide a report of these application usage details along with other details of components on the managed device to a management server. The management server can evaluate reports received from a number of agents to generate rankings of applications and components that are based at least partially on usage. The management server can then identify available updates and present recommendations for deploying the updates based on the rankings.

20 Claims, 12 Drawing Sheets

(56) References Cited

U.S. PATENT DOCUMENTS

| | | | | |
|---|---|---|---|---|
| 2015/0350807 A1* | 12/2015 | Andrews | ............... | H04W 76/14 |
| | | | | 455/414.2 |
| 2015/0350885 A1* | 12/2015 | Stanley-Marbell | ..... | H04W 8/22 |
| | | | | 455/418 |
| 2016/0124652 A1* | 5/2016 | Adamson | .......... | G06F 17/30312 |
| | | | | 711/171 |

OTHER PUBLICATIONS

Eclipse, "Daemons", 2016, https://help.eclipse.org/neon/index.jsp?topic=%2Forg.eclipse.stardust.docs.dev%2Fhtml%2Fconcepts%2Fadmin-concepts%2Fag-concepts-2.htm.*

* cited by examiner

ANALYTICS DRIVEN UPDATE NOTIFICATION

CROSS-REFERENCE TO RELATED APPLICATIONS

N/A

BACKGROUND

A number of device management products exist such as IBM Endpoint Manager, Microsoft Intune, HP Openview, IGEL Device Manager, etc. One function of these device management products is updating the managed devices. In each of these products, the update functionality is configured to identify whenever an update is available to any component (e.g, OS, drivers, BIOS, applications, etc.) on the managed device. When an update is available, the device management product will automatically update or offer the update to the managed device. Similar update functionality is provided by application stores on mobile operating systems (e.g., the Google Play Store or Apple App Store). In particular, these application stores will either automatically update every installed application or prompt the user to authorize the update.

In short, the update functionality that is currently available will cause all components to be updated regardless of whether a component is used. For some devices, such as those with limited storage resources, updating all components can cause various performance issues. For example, due to the risk that an update may cause errors, it is typical to store sufficient information to allow the update to be rolled back. When a device has limited storage, this rollback information can consume excessive amounts of storage.

BRIEF SUMMARY

The present invention extends to methods, systems, and computer program products for implementing analytics driven update notifications. An agent on a managed device can monitor which applications are being used on the managed device and can provide a report of these application usage details along with other details of components on the managed device to a management server. The management server can evaluate reports received from a number of agents to generate rankings of applications and components that are based at least partially on usage. The management server can then identify available updates and present recommendations for deploying the updates based on the rankings.

In one embodiment, the present invention is implemented as a method for providing analytics driven update notifications. An agent that executes on a managed device can identify, at a polling interval, an application that is currently active at each polling interval. The agent can also identify an active duration for each identified application and report each identified application with the corresponding active duration to a management service. The management service can identify, for at least one of the identified applications, an update that is available for the identified application. For each available update, the management service can present, to an administrator, an update notification that includes a recommendation that is based at least partially on the active duration for the corresponding application.

In another embodiment, the present invention is implemented as method for providing analytics driver update notifications. A management service can receive, from each of a plurality of agents that execute on managed devices, a report that specifies applications that the agent identified as being active along with an active duration for each application. Based on the reports, the management service can generate rankings which reflect how much each of the applications identified in the reports has been used. The management service can also determine that an update is available for at least one of the applications identified in the reports and then present, to an administrator, an update notification for each update that is available. Each update notification can include a recommendation that is based on the rankings.

In another embodiment, the present invention can be implemented as computer storage media that includes computer executable instructions which when executed implement an agent that is configured to execute on a managed device and a management service. The agent is configured to identify a currently active application on the managed device at a polling interval during a reporting period and to report each identified application along with an active duration for each identified application to a management service. The management service is configured to receive the report of the identified applications from each of a number of agents and to generate a combined active duration for each identified application reported by the agents. The management service is further configured to present an update notification to an administrator for any update that is available for the identified applications. Each update notification includes a recommendation that the management service generates based on the combined active duration for the corresponding application.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "managed device" should be construed as any computing device on which an agent is executed for the purpose of interfacing with a management server to perform embodiments of the present invention. Therefore, a managed device can include a desktop computer, a laptop computer, a thin client, a tablet, a smart phone, etc. It is noted, however, that the present invention may be particularly beneficial when the managed devices are thin clients which have limited storage and/or processing resources. The term "components" will be used to generally refer to updatable aspects, other than applications, of a managed device. Components may therefore include the operating system, drivers, and hardware details.

Figure 1:
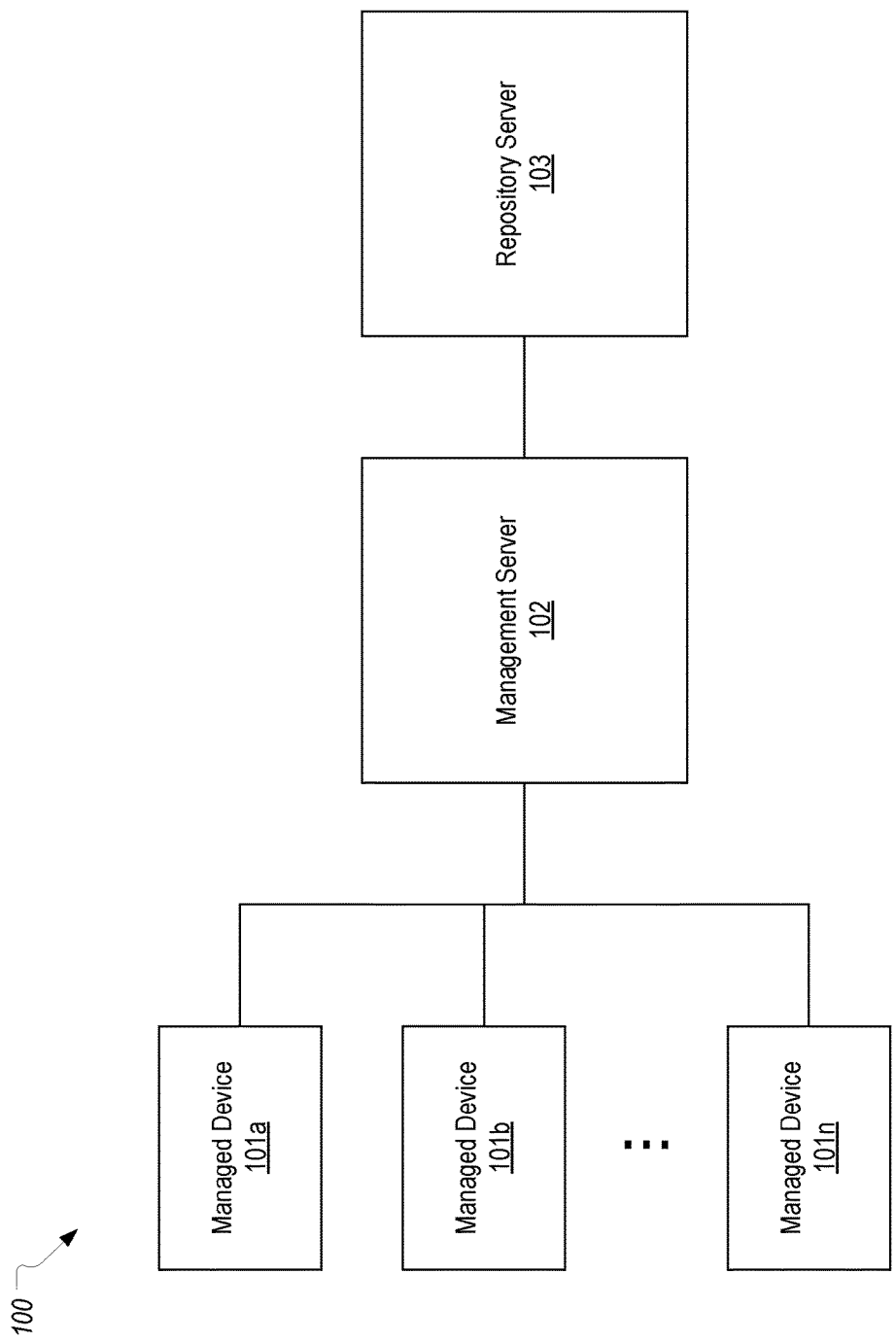
FIG. 1 illustrates an example computing environment in which the present invention can be implemented.

FIG. 1 illustrates an example computing environment 100 in which the present invention can be implemented. Computing environment 100 includes a number of managed devices 101a-101n (where n represents any integer) that are each connected to a management server 102. Management server 102 and managed devices 101a-101n may oftentimes be connected via a LAN but could be connected via any type of network connection. Management server 102 is also connected to a repository server 103. Management server 102 and repository server 103 could represent separate physical computing devices, the same physical computing device, components of a cloud computing environment, etc.

In typical implementations, managed devices 101a-101n can represent a group of managed devices sharing common characteristics. For example, managed devices 101a-101n may represent thin clients that are used by members of an accounting group or by members of a marketing group since such groups would typically employ computing devices that are similarly configured (e.g., that run the same OS and have the same set of applications). In other words, the present invention, as described below, can typically be implemented at a group level. In such cases, management server 102 may manage a number of other groups of managed devices in addition to managed devices 101a-101n. It is noted, however, that the present invention should not be limited to cases where managed devices 101a-101n represent a group within an organization, but should extend to instances where managed devices 101a-101n represent all managed devices of a particular organization, a particular group of organizations, or some other structure.

Figure 2:
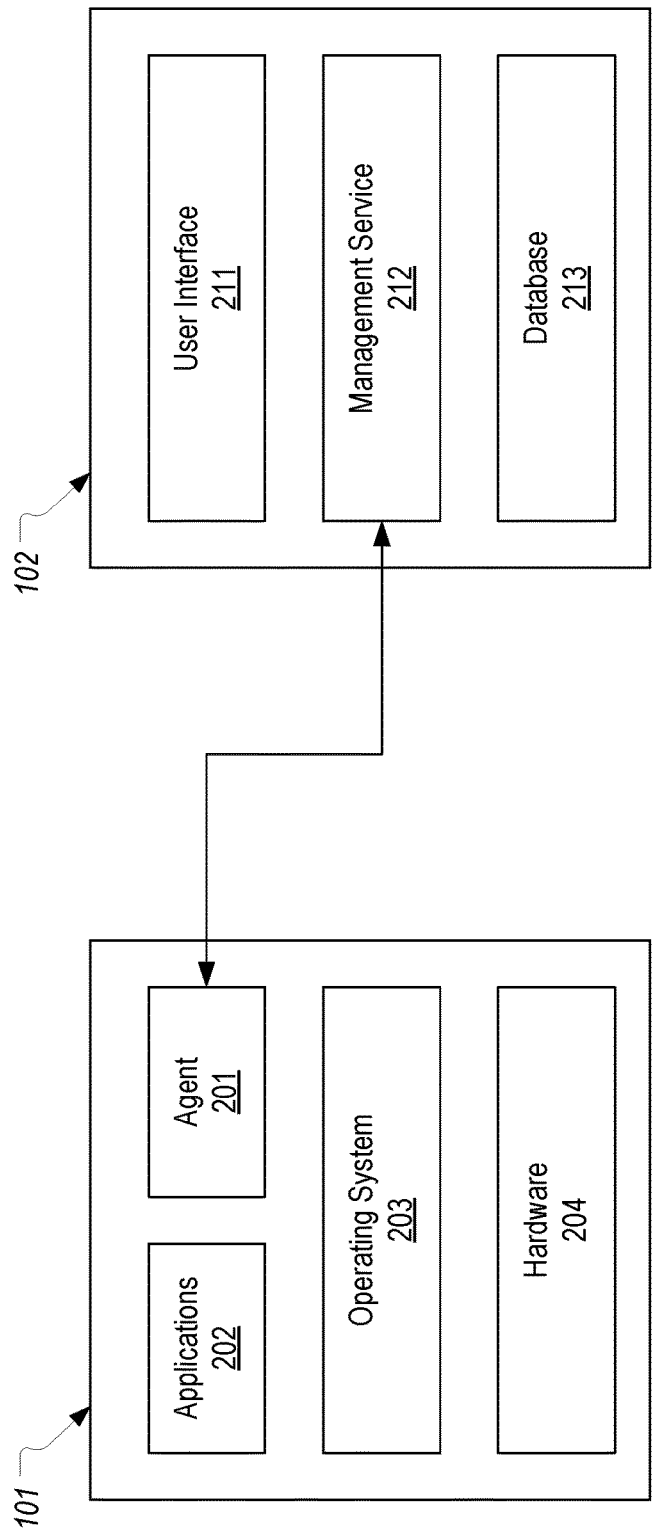
FIG. 2 illustrates various components that can be employed on a managed device and a management server to implement embodiments of the present invention.

FIG. 2 illustrates various components that may be included on each of managed devices 101a-101n (which may be referred to collectively as managed device 101) as well as various components of management server 102. As shown, managed device 101 includes hardware 204, an operating system 203, various applications 202, and an agent 201. Management server 102 includes a management service 212 that is configured to interface with agent 201, a database 213 for storing various types of information used to implement the present invention, and a user interface 211 by which an administrator may configure management server 102 and may provide input to specify which updates to deploy to managed devices 101a-101n.

By way of overview, agent 201 can be configured to identify which components (e.g., operating system, hardware, drivers, etc.) are present and/or loaded on managed device 101 and may also identify which of applications 202 are being used. Agent 201 can then communicate this information to management service 212. Management service 212 will in turn employ the information received from the instance of agent 201 on each of managed devices 101a-101n to generate rankings of applications and/or components based at least partially on usage. Management service 212 can then employ these rankings to retrieve updates to be deployed to managed devices 101a-101n. In this way, management service 212 can identify and deploy updates only for applications and/or components that are being used such that resources will not be consumed to update unused (or infrequently used) applications or components.

FIGS. 3A-3H illustrate an example sequence of steps that can be performed to accomplish this analytics-based update process. For purposes of this example, it will be assumed that agent 201 on managed device 101 has already registered with management server 102 and received any necessary configuration/policy settings (e.g., timing intervals) to be used in the update process. It is noted that the steps that are depicted as being performed by agent 201 can be performed by each agent instance on the various managed devices 101a-101n. For ease of illustration, however, a single managed device is depicted.

A primary responsibility of agent 201 is to identify which applications are used on managed device 101. Agent 201 can also identify which components exist and/or are loaded on managed device 101 such that a complete update solution can be provided (i.e., an update solution in which applications and components are updated). Accordingly, in step 1 shown in FIG. 3A, agent 201 identifies the active application at specified intervals. For example, agent 201 can be configured to obtain the handle/identifier of the currently active application (e.g., by calling the GetForegroundWindow function in Windows or the XGetInputFocus function in Linux) at a polling interview (such as every 5 seconds) and use the handle/identifier to obtain the name of the application (e.g., Internet Explorer or RDP). Agent 201 can also identify how long the currently active application has been active. Based on this periodic polling of the active application, agent 201 can compile a list of which applications have been active and for how long. It is important to note that, in this context, the currently active application is the application that the user is currently using (e.g., the Window that has focus). Therefore, the currently active application should be distinguished from the many other applications that may also be running at the same time. In short, agent 201 attempts to track which applications the user is using rather than applications that may be running (e.g., in the background).

Figure 4:
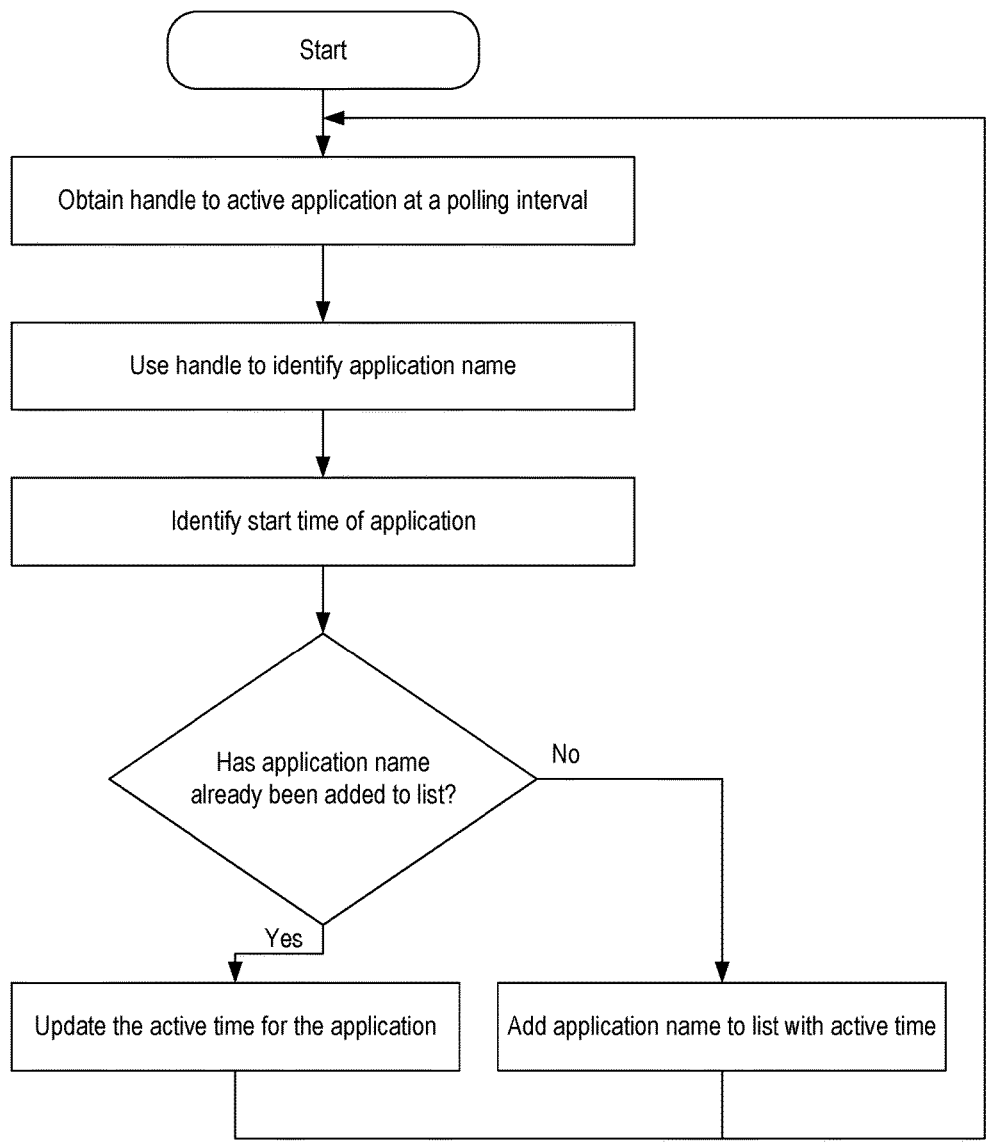
FIG. 4 illustrates an example flow diagram depicting how the currently active application and how long it has been active can be identified.

There are a number of techniques that agent 201 can employ to identify how long an application has been active. For example, agent 201 could simply increment an "active time" for a particular application by the polling interval each time the application is identified as being active. For example, if the polling interval is 5 seconds, each time agent 201 detects that a particular application is active, it can increment that application's active time by 5 seconds. Alternatively, agent 201 could employ operating-system-provided functions to identify how long a particular application has been running. For example, in Windows, the New-TimeSpan cmdlet in the Windows PowerShell (e.g., New-TimeSpan-Start (get-process mstsc).StartTime) can be employed to identify how long the application has been running. Many other techniques could equally be used. Regardless of how agent 201 identifies/estimates how long a current active application has been running, agent 201 can store a listing of each application that has been detected as the active application during the polling process and can also store an "active time" for each of the applications in the list. A flowchart representing this process of identifying active applications and how long they have been active is provided in FIG. 4.

Figure 3A:
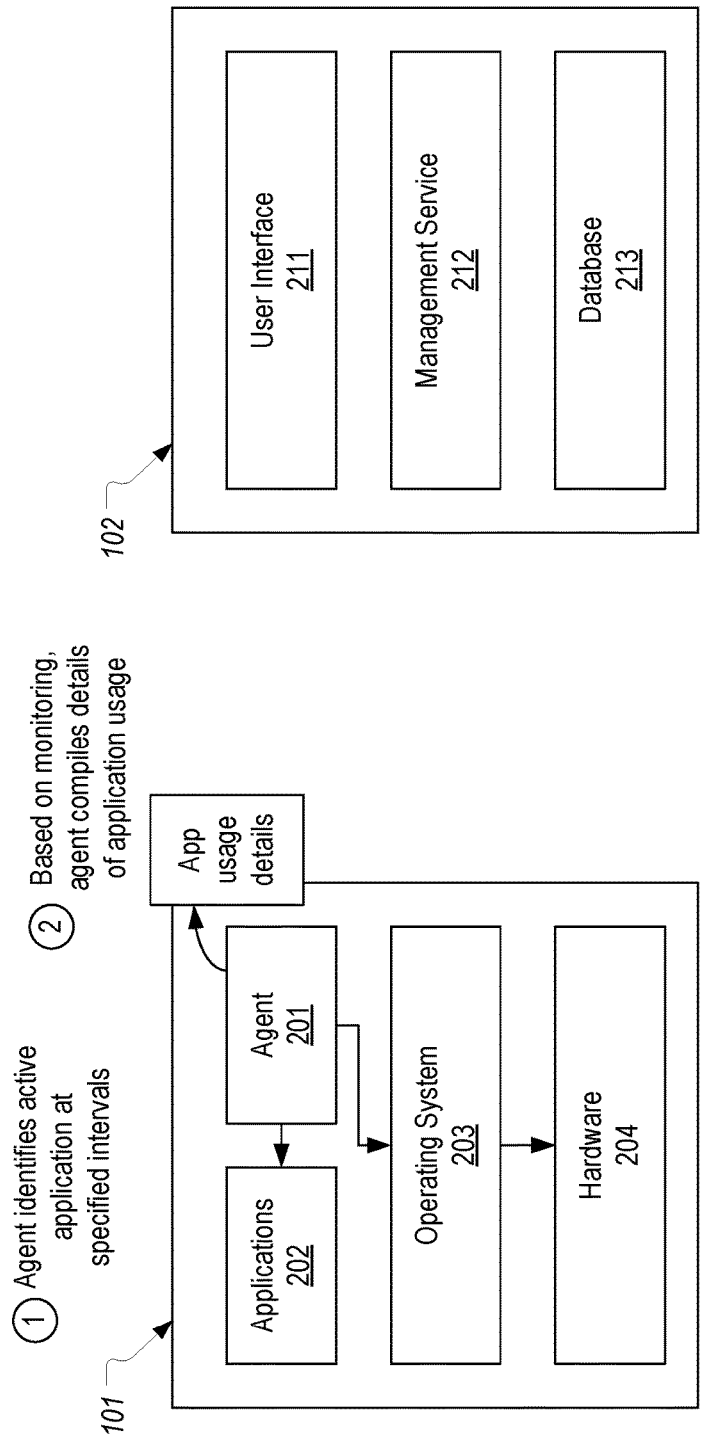
FIGS. 3A-3H illustrate an example sequence of steps that can be performed to implement embodiments of the present invention.
Figure 3B:
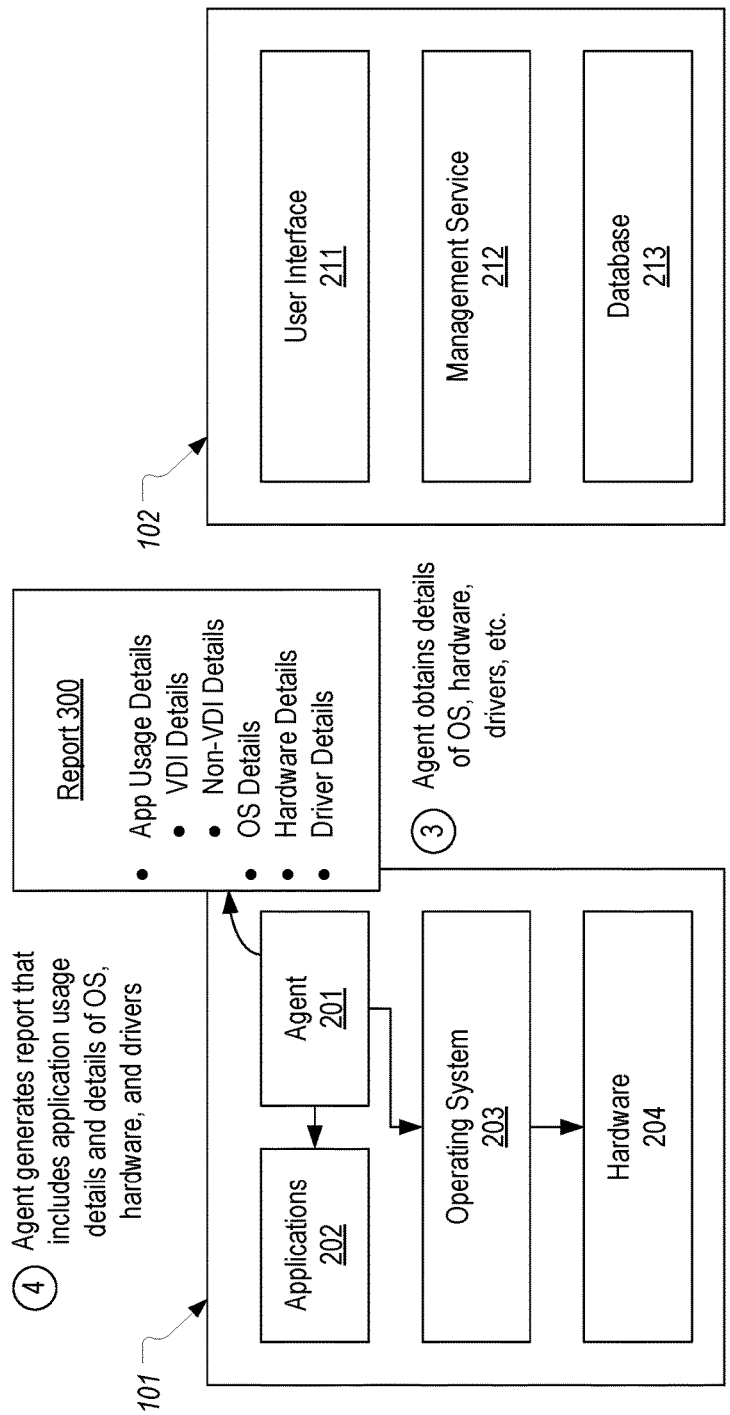

In some embodiments, in addition to compiling these "application usage details," agent 201 can also obtain details of other components of managed device 101 such as operating system details, hardware details, and driver details as represented in step 3 shown in FIG. 3B. Agent 201 can obtain such details using various API calls made available by operating system 203. For example, agent 201 could identify a version of the operating system 203, installed updates to operating system 203, information about hardware 204 (e.g., a model number for the managed device), information about loaded drivers, etc. Since these components are unlikely to change during a particular reporting period, agent 201 may compile the component details once rather than at a polling interval.

Next, in step 4 which may be performed at specified "reporting intervals" (e.g., every 8 hours), agent 201 can generate a report 300 that includes the application usage details and may preferably also include the other component details. In some embodiments of the present invention, such as when the managed devices 101 are thin clients or other computing devices that employ a VDI client, agent 201 may distinguish between VDI and non-VDI applications. In particular, when managed devices 101 are thin clients, the VDI application(s) will be critical components. In such cases, agent 201 can distinguish the VDI applications from the non-VDI applications to allow the VDI applications to be treated differently (e.g., to be given higher priority for update purposes).

The following is an example of a report 300 that is in JSON format and represents how agent 201 may report the application usage details and component details to management service 212.

```
{
  "OSDetails" : {
    "Name" : "Windows Embedded Standard 7",
    "Version" : "6.1",
    "Hotfixes" : [
      "KB390789",
      "KB905678"
    ]
  },
  "HardwareDetails" : {
    "Name" : "Z90D7",
    "Revision" : "1204",
    "BIOS" : "3.1.1",
    "Merlin" : "3.4.2"
  },
  "DriverDetails" : [
    {
      "Name" : "PnPDriver",
      "Description" : "Plug and Play Driver",
      "Version" : "1.2",
      "Publisher" : "Dell Inc"
    },
    {
      "Name" : "Network Driver",
      "Description" : "Network Driver",
      "Version" : "2.3",
      "Publisher" : "Intel"
    }
  ],
  "VDIDetails" : {
    "Name" : "RDP",
    "Version" : "7.0",
    "ActiveDuration" : "7000",
    "Publisher" : "Microsoft"
  },
  "OtherApplicationDetails" : [
    {
      "Name" : "Internet Explorer",
      "Version" : "9.0",
      "ActiveDuration" : "5000",
      "Publisher" : "Microsoft"
    },
    {
      "Name" : "Lync",
      "Version" : "9.0",
      "ActiveDuration" : "5000",
      "Publisher" : "Microsoft"
    }
  ]
}
```

In general, report 300 represents a profile of managed device 101. However, this profile does not simply identify all applications that are installed on managed device 101, but rather only the applications that the user employed during the reporting period. In this example, it is assumed that agent 201 has identified that managed device 101 is running Windows Embedded Standard 7 version 6.1 and has received two hotfixes. It is also assumed that agent 201 has identified managed device 101 as a Z90D7 device (which is a type of thin client offered by Dell Wyse) having a revision of 1204, a BIOS version of 3.1.1 and a Merlin version of 3.4.2 (which is an imaging tool). For simplicity, it is assumed that agent 201 has identified only two drivers: a Plug and Play driver and a network driver.

This example additionally shows how agent 201 can identify an active time (or ActiveDuration) for each active application and distinguish between VDI and non-VDI applications. For example, one VDI application, RDP, is identified as having an active time of 7000 seconds. To exemplify benefits of the present invention, it will be assumed that two other VDI applications, Citrix and VMWare, are also installed on managed device but were not used during the polling period and therefore do not appear in report 300. The details of the non-VDI applications are similarly reported. Importantly, the VDI applications are distinguished from the non-VDI applications (which is accomplished in this example by including a different JSON key for each type of application).

Figure 3C:
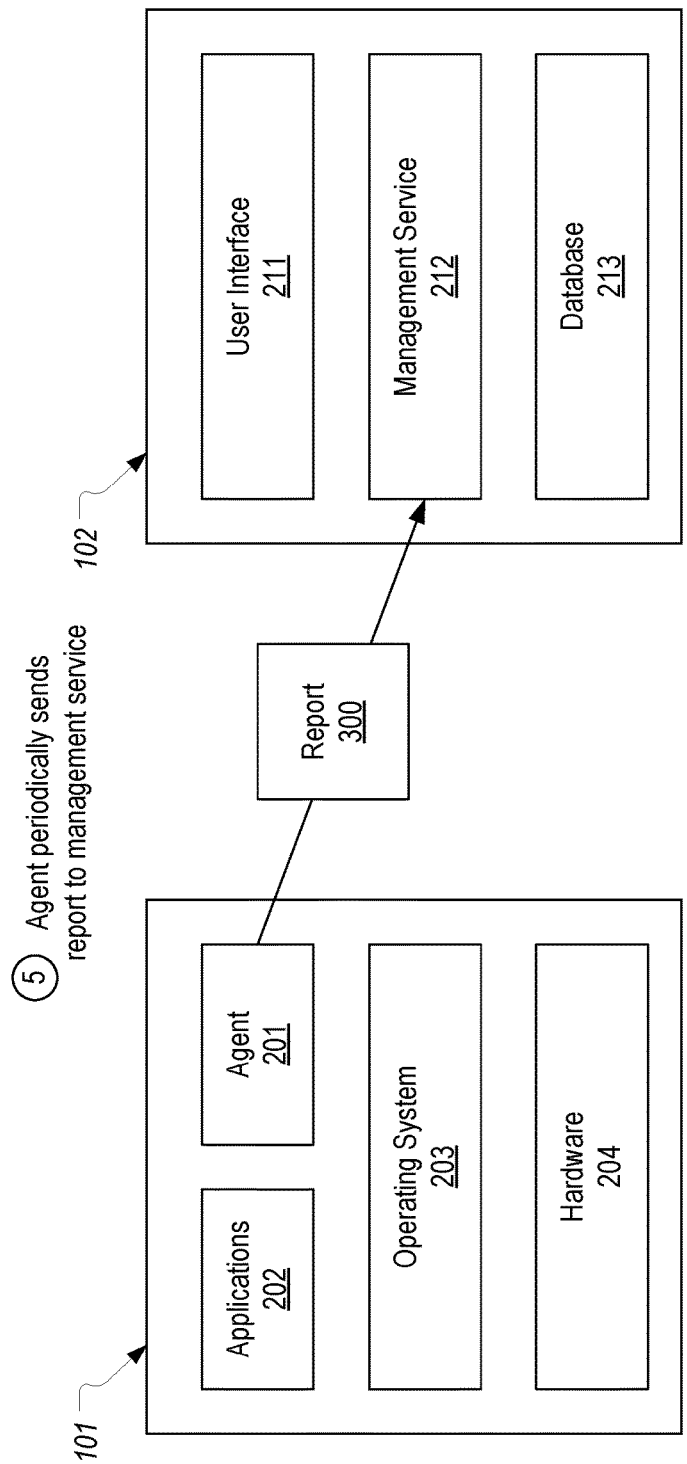

With report 300 generated, agent 201 can send the report to management service 212 as represented in step 5 in FIG. 3C. As indicated above, agent 201 on each of managed devices 101a-101n can perform steps 1-5 at defined times/intervals. For example, agent 201 can continuously monitor the active applications (e.g., by polling the active application every 5 seconds) and generate and send report 300 every 8 hours. In such a case, agent 201 could obtain the OS, hardware, and driver details at any time during the reporting period (e.g., right before sending report 300). The timing at which agent 201 can perform each of these steps can be a configurable setting that management server 102 provides to agent 201 when agent 201 registers or checks in with the management server.

Figure 3D:
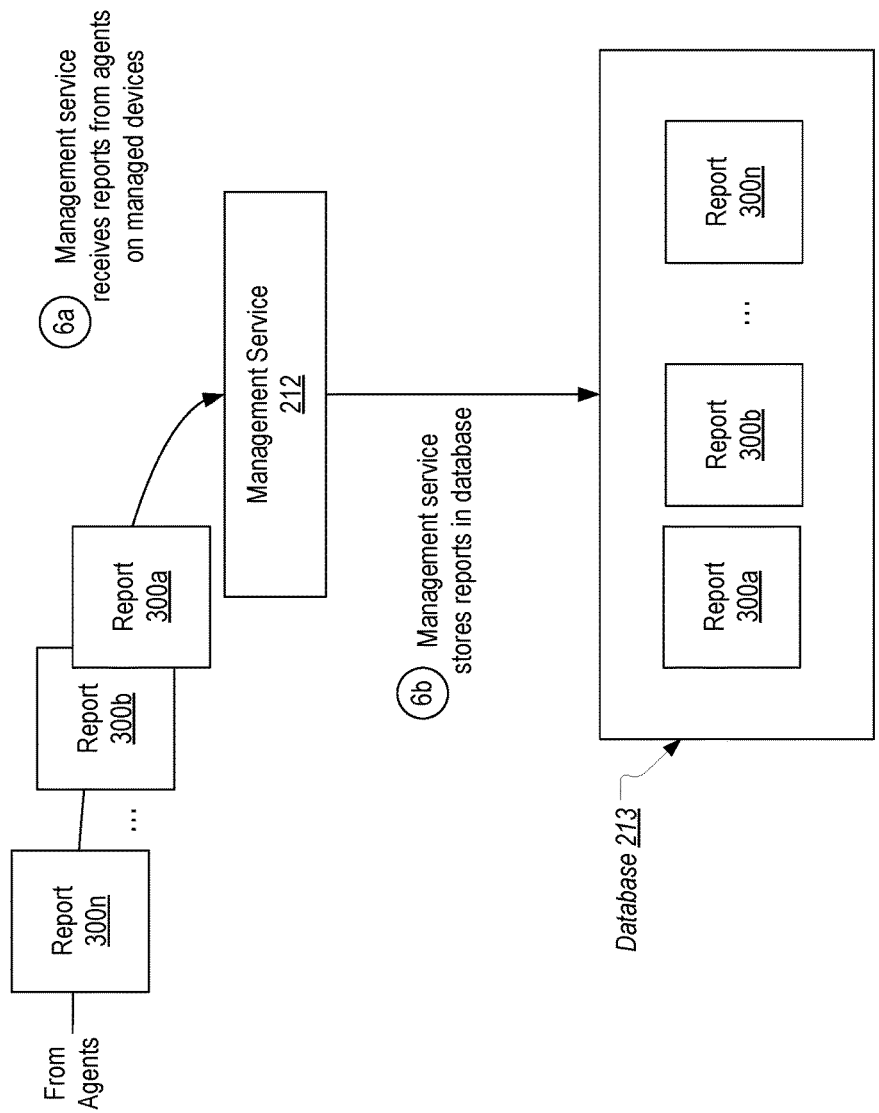

In any case, the end result of steps 1-5 is that management service 212 will receive a number of reports 300a-300n from the various instances of agent 201 on managed devices 101a-101n as is represented in step 6a of FIG. 3D. Management service 212 could receive these reports at the same general time or at various times depending on how each agent instance is configured. When management service 212 receives a report, it can store the report in database 213 for later processing as is shown in step 6b. These reports can include multiple reports sent by the same agent 201. For example, in a case where agent 201 is configured to send a report 300 every 8 hours and management service 212 is configured to process these reports every 24 hours, management service 212 can receive 3 reports from each agent instance prior to processing the stored reports. Of course, agent 201 could be configured to send report 300 on a similar schedule as management service 212 processes the reports and therefore timing is not an essential aspect of the present invention.

Figure 3E:
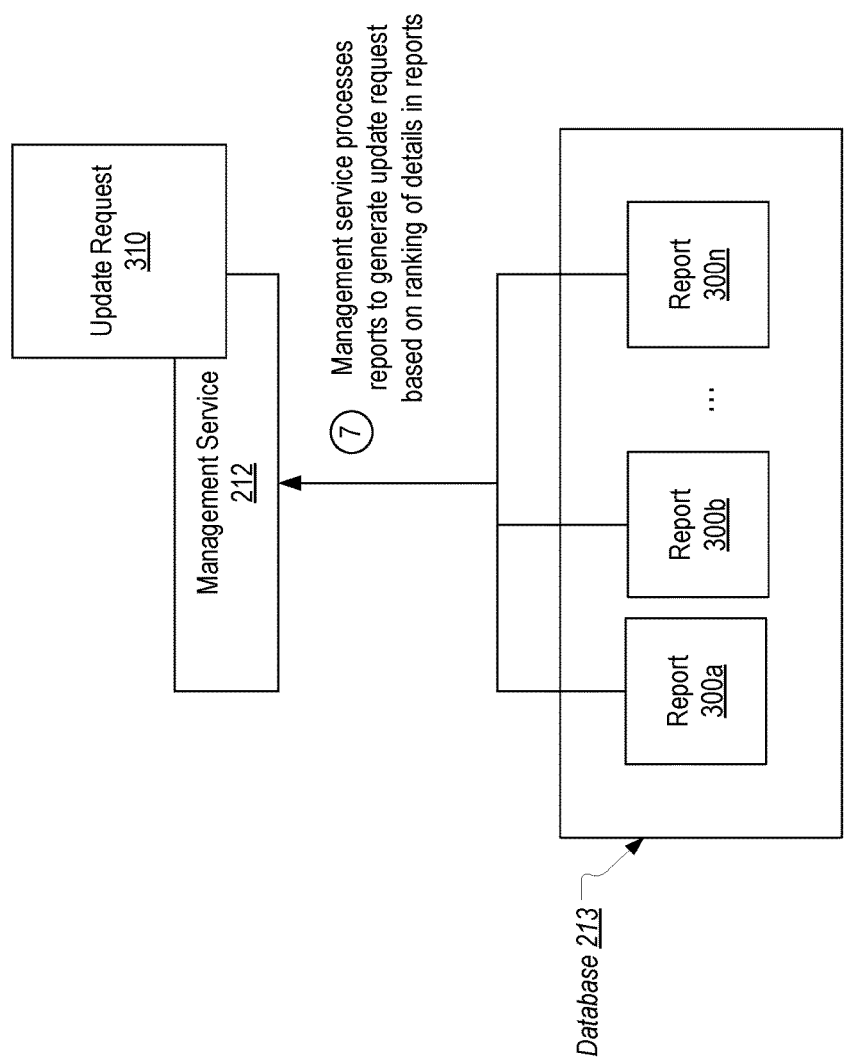

At the end of some defined interval (e.g., every 24 hours), management service 212 can evaluate each stored report 300a-300n to generate an update request 310 as shown in step 7 of FIG. 3E. Importantly, management service 212 can generate update request 310 based on a ranking of the details provided in reports 300a-300n. In particular, for each detail type (e.g., for each of the OSDetails, HardwareDetails, DriverDetails, VDIDetails, and OtherApplication Details), management service 212 can identify each unique item including a count for the item. For example, management service 212 can identify that Windows Embedded Standard 7 and WTOS appear in the OSDetails of reports 300a-300n and can also identify a number of occurrences of each OS in reports 300a-300n. Similar identification and counting of occurrences for the HardwareDetails and DriverDetails can also be performed.

With regards to the VDI and non-VDI applications, a different counting technique can be employed. Rather than counting the number of occurrences of each application in reports 300a-300n, management service 212 can instead sum the ActiveDuration values for each application. As an example, if there are two reports that each identify RDP and provide ActiveDuration values of 7000 and 5000 respectively, management service 212 can generate a count of 12000 (7000+5000) for RDP.

The purpose of performing this counting is to identify which applications are used most frequently on managed devices 101a-101n. Similarly, the counting of the other components can identify how many of the managed devices include a particular component (e.g., how many managed devices are running Windows as opposed to WTOS or how many managed devices are running one version of Windows as opposed to another version of Windows). By performing this counting, management service 212 can rank the various updatable components based on their prevalence among managed devices 101a-101n and can rank the various applications based on how much they are used.

The following JSON example illustrates how management service 212 can format update request 310 to reflect this ranking.

```
{
"OSUpdate" : [
{
  "Name" : "Windows Embedded Standard 7",
  "Version" : "6.1"
},
{
  "Name" : "WTOS",
  "Version" : "3.4"
}
],
"HardwareUpdate" : [
{
  "Name" : "Z90D7",
  "BIOS" : "3.1.1"
},
{
  "Name" : "Z90Q7",
  "BIOS" : "3.2.5"
}
],
"DriverUpdate" : [
{
  "Name" : "PnPDriver",
  "Version" : "1.2",
  "OS" : "Windows Embedded Standard 7",
  "OSVersion" : "6.1"
},
{
  "Name" : "Network Driver",
  "Version" : "3.2",
  "OS" : "WTOS",
  "OSVersion" : "3.4"
}
],
"VDIUpdate" : [
{
  "Name" : "RDP",
  "Version" : "7.0",
  "OS" : "Windows Embedded Standard 7",
  "OSVersion" : "6.1"
},
```

-continued

```
},
{
  "Name" : "RDP",
  "Version" : "7.0",
  "OS" : "WTOS",
  "OSVersion" : "3.4"
}
],
"OtherApplicationUpdate" : [
{
  "Name" : "Internet Explorer",
  "Version" : "7.0",
  "OS" : "Windows Embedded Standard 7",
  "OSVersion" : "6.1"
},
{
  "Name" : "Firefox",
  "Version" : "5.0",
  "OS" : "WTOS",
  "OSVersion" : "3.1"
},
{
  "Name" : "Lync",
  "Version" : "9.0",
  "OS" : "Windows Embedded Standard 7",
  "OSVersion" : "6.1"
}
]
}
```

In this example, it is assumed that management service 212 has determined, based on reports 300a-300n, that Windows Embedded Standard 7, Version 6.1 is installed on more of managed devices 101a-101n than WTOS, Version 3.4 as indicated by Windows Embedded Standard 7 being listed first. In other words, the ordering of the entries in update request 310 is one way in which management service 212 can define the rankings. Of course, other techniques for defining rankings can equally be employed such as by including a ranking key/value pair in the JSON structure of update request 310.

The remainder of update request 310 can be structured in a similar manner. However, with regards to drivers, VDI applications, and non-VDI applications, the OS and OS version can be included in the details since these are dependent on the OS. Also, the rankings for applications will be based on how much each application is used. For example, with regards to VDI applications, update request indicates that RDP, Version 7.0 on Windows Embedded Standard 7, Version 6.1 managed devices is the most used VDI application, while RDP, Version 7.0 on WTOS, Version 3.4 managed devices is the second most used VDI application. For ease of illustration, it will be assumed that reports 300a-300n did not identify any other VDI applications.

In summary, management service 212 can generate update request 310 which includes a listing of the various types of components and applications with each type being ranked. Importantly, the applications are ranked based on usage.

Figure 3F:
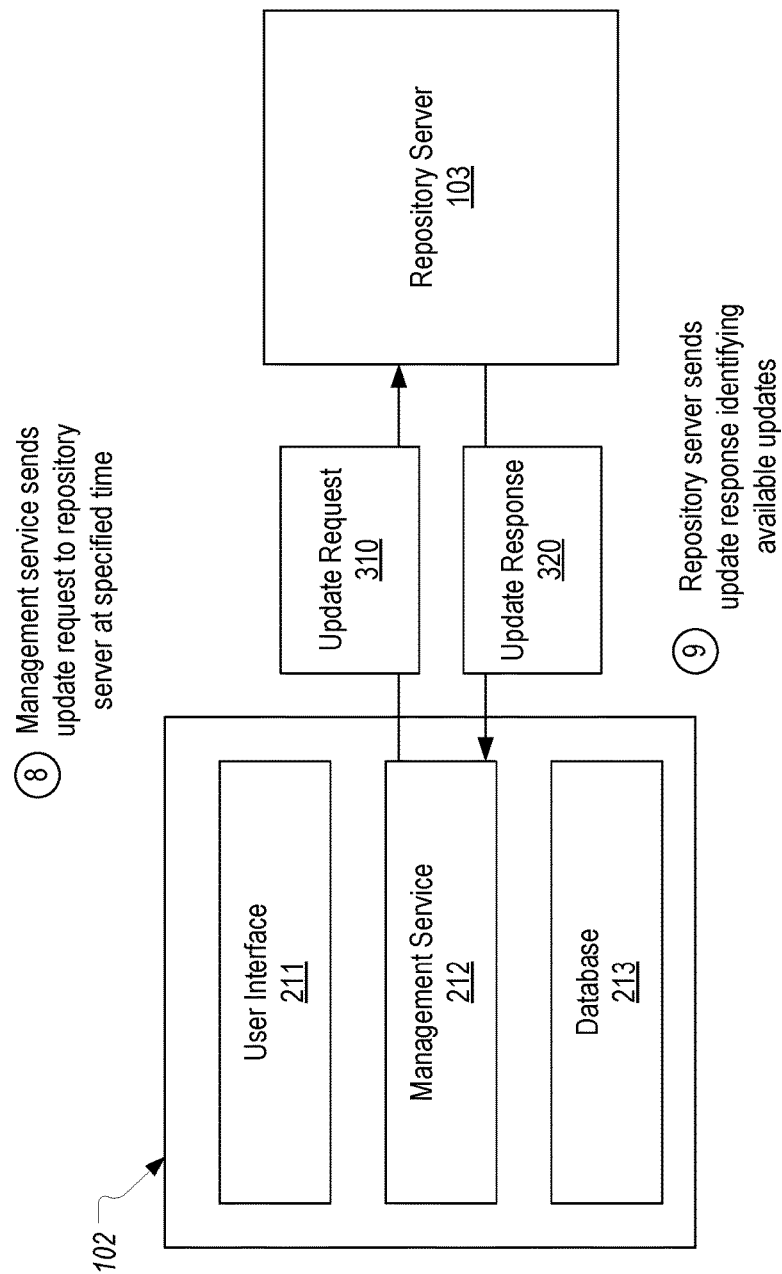

Turning now to FIG. 3F, in step 8, management service 212 can send update request 310 to repository server 103. As mentioned above, management service 212 could be configured to send an update request at a defined interval (e.g., every 24 hours). Update request 310 will identify to repository server 103 which updatable components are present on managed devices 101a-101n and which applications are being used on managed devices 101a-101n. Repository server 103 can comprise a repository for all updates that could apply to any of managed devices 101a-101n. For example, repository server 103 can be configured to retrieve and store updates from the various vendors (e.g., Microsoft, Dell, Citrix, etc.) when they are made available for the particular types/configurations of managed devices 101a-101n.

Upon receiving update request 310, repository server 103 can parse its contents to identify each component and application. Repository server 103 can then determine whether an update is available for each particular component or application. If an update is available, repository server 103 can also identify a location (e.g, a URL) from which the update can be retrieved. Repository server 103 can then generate and send, in step 9, an update response 320 that lists the updates that are available for the components and applications defined in update request 310 and can also specify the location for retrieving a particular update. The following JSON object provides an example of how update response 320 can be configured.

```
{
  "OSUpdate" : [
  {
    "Name" : "Windows Embedded Standard 7",
    "Version" : "6.1",
    "Download Location" : "https://PackageRepoServer/OSUpdate/WES7/"
  }
  ],
  "HardwareUpdate" : [
  {
    "Name" : "Z90D7",
    "BIOS" : "3.1.1",
    "Download Location" : "https://PackageRepoServer/Z90D7/BIOSUpdate/3.1.1/"
  }
  ],
  "DriverUpdate" : [
  {
    "Name" : "PnPDriver",
    "Version" : "1.2",
    "OS" : "Windows Embedded Standard 7",
    "OSVersion" : "6.1",
    "Download Location" : "https://PackageRepoServer/WES7/PnpDriver/1.2/"
  }
  ],
  "VDIUpdate" : [
  {
    "Name" : "RDP",
    "Version" : "7.0",
    "OS" : "Windows Embedded Standard 7",
    "OSVersion" : "6.1",
    "Download Location" : "https://PackageRepoServer/WES7/VDI/RDP/7.0/"
  }
  ],
  "OtherApplicationUpdate" : [
  {
    "Name" : "Internet Explorer",
    "Version" : "7.0",
    "OS" : "Windows Embedded Standard 7",
    "OSVersion" : "6.1",
    "Download Location" : "https://PackageRepoServer/WES7/OAU/IE/7.0/"
  }
  ]
}
```

After receiving update response 320, management service 212 can employ user interface 211 to present notifications of the available updates to an administrator. Management service 212 can employ the information received in reports 300a-300n and/or compiled into update request 310 to present the update notifications in a manner that reflects the rankings. In other words, management service 212 can present update notifications with recommendations that are based on this information. For example, with regards to the available update to Windows Embedded Standard 7, management service 212 could determine that a large percentage of managed devices 101a-101n are running this OS and can therefore recommend the update. In some embodiments, in conjunction with its recommendation, management service 212 can display the criteria on which its recommendation is based (e.g., by presenting the number/percentage of managed devices 101a-101n that are running the OS). It is noted that, for some updates such as critical updates, management service 212 may recommend an update regardless of any usage details.

With regards to applications for which an update is available, management service 212 can base its recommendation on how much the particular application is used. For example, if an update is available for an application that is used relatively infrequently, management service 212 may not recommend that the update be deployed. As a result, and assuming the administrator follows the recommendation to not deploy the corresponding update, resources on managed devices 101a-101n will not be consumed to update an application that is used infrequently. Also, because applications that are not used at all will not have been reported to management service 212 in the first place, updates to these unused applications will not be presented in this process. In this way, the present invention bases the application update process on usage rather than presence of the applications on managed devices 101a-101n.

Figure 3G:
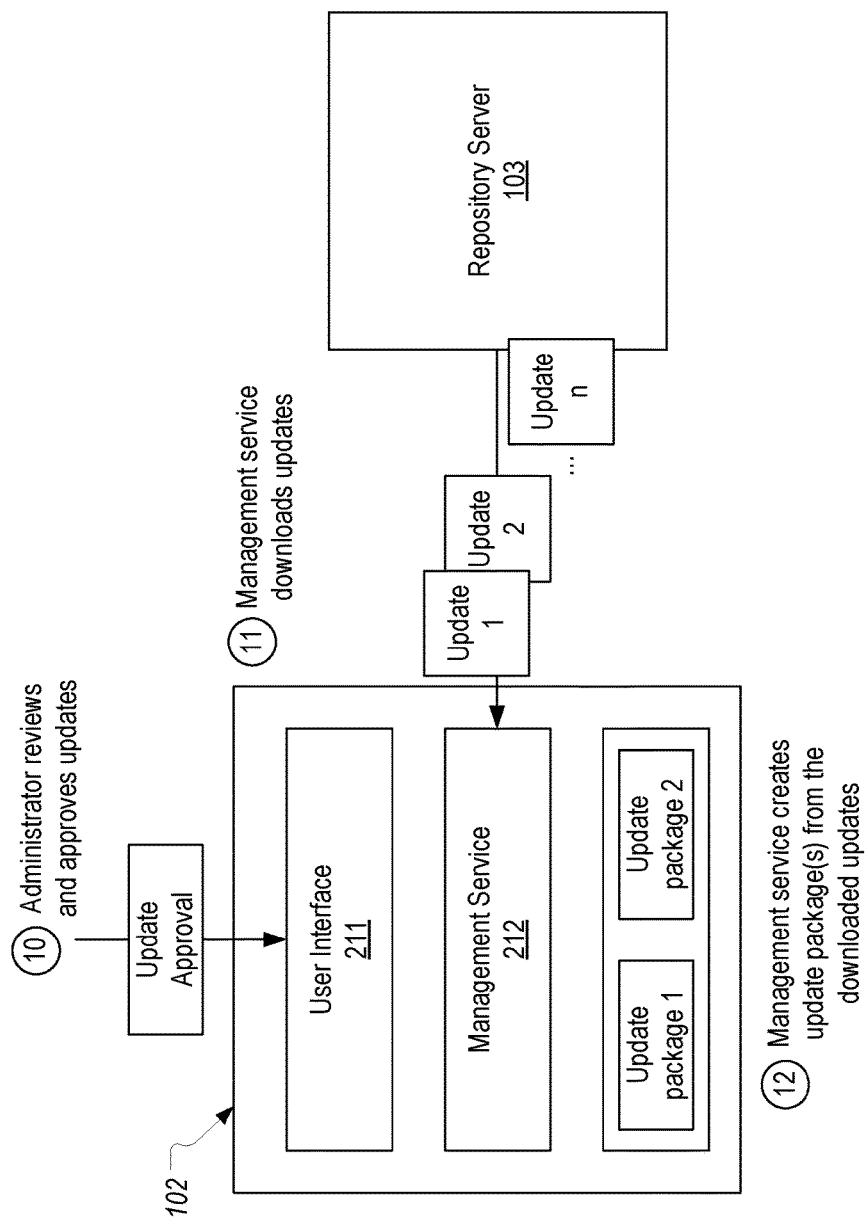

After an administrator has reviewed the available updates, he or she can select which updates to deploy to managed devices 101a-101n (which may represent a defined grouping of managed devices) and submit approval to deploy these selected updates in step 10 shown in FIG. 3G. In response, management service 212 can employ the location defined for each selected update in update response 320 to download the selected updates to management server 102 in step 11 and store them in database 213 in one or more update packages in step 12. More than one update package may be defined for a group of managed devices in cases where the group includes different types of managed devices (e.g., those running Windows vs. those running WTOS) since not all updates would be applicable to each managed device. Alternatively, a single update package could be defined for the group and the logic for selecting which updates are applicable to a particular managed device could be implemented in agent 201 upon receiving/retrieving the update package.

Figure 3H:
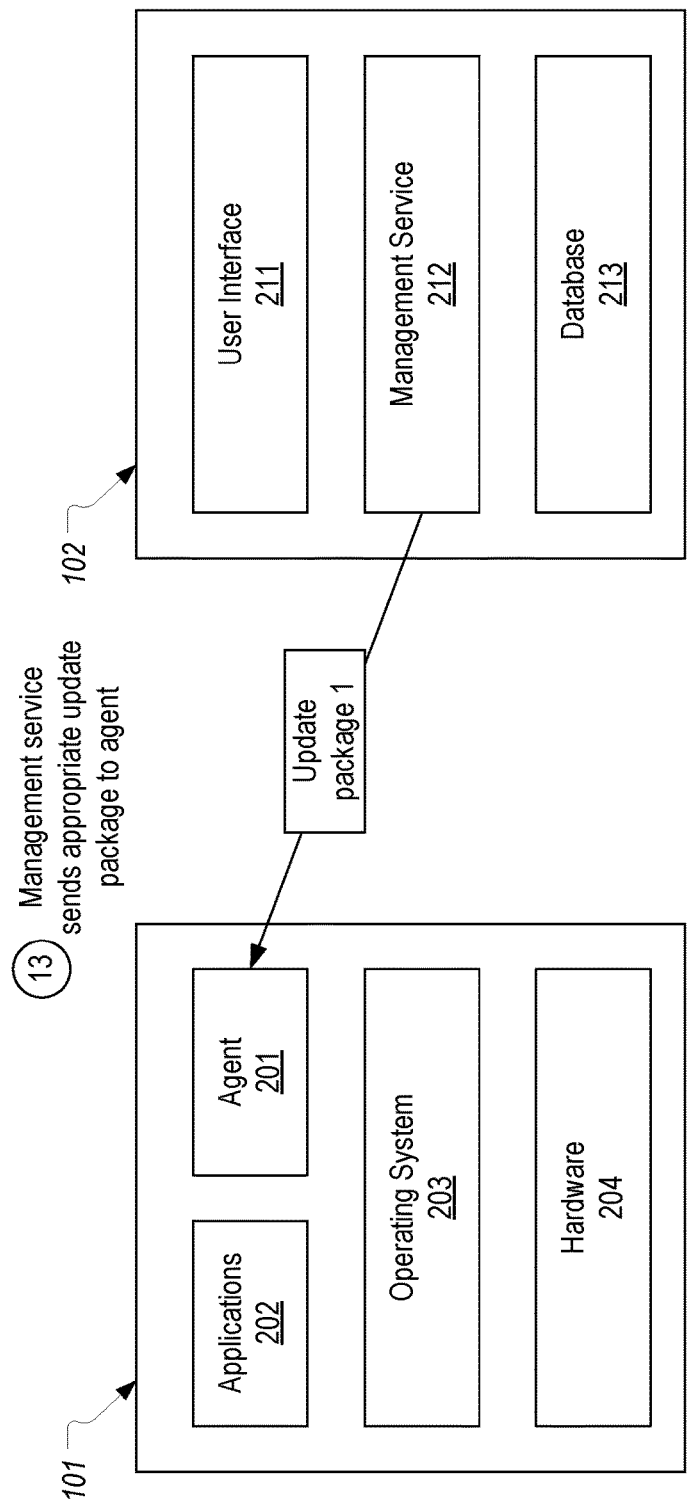

Finally, in step 13 shown in FIG. 3H, the update package can be delivered to agent 201 to deploy the updates on managed device 101. Importantly, due to agent 201's reporting of which applications are used, the update package should not include updates to unused applications. Similarly, due to management service 212's usage-based recommendations, the update package may not include updates to infrequently used applications (assuming the administrator followed the recommendations). As a result, fewer resources may be consumed on managed device 101 to deploy the updates in the update package. For example, if RDP and Citrix are installed on managed device 101 but the user does not use Citrix, the present invention will prevent updates to Citrix from being deployed to managed device 101 where the updates would likely consume a substantial amount of the possibly limited resources of managed device 101. Similarly, if a driver, for which an update is available, is loaded on relatively few of managed devices 101a-101n, the administrator, acting on a recommendation from management service 212, may block the update from being deployed to managed devices 101a-101n and can therefore eliminate any potential issues that could result from updating the driver.

Figure 5:
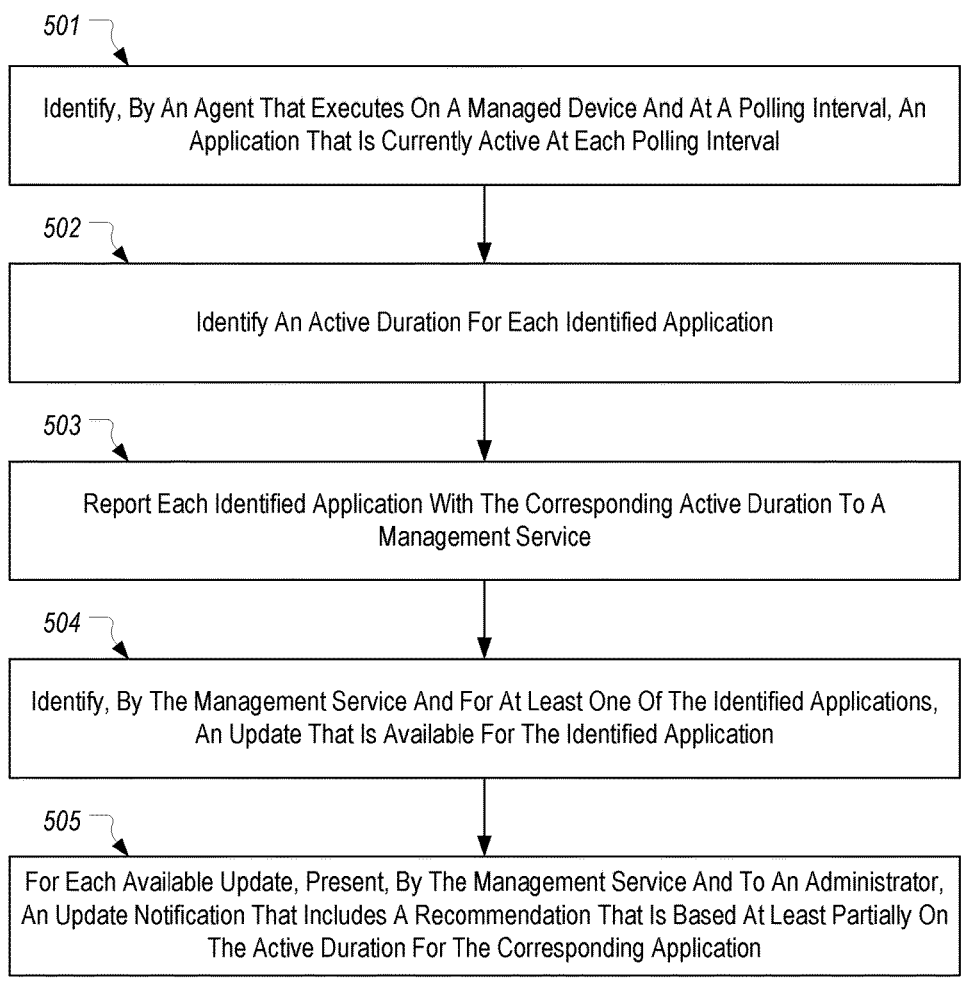
FIG. 5 provides a flowchart of an example method for providing analytics driven update notifications.

FIG. 5 provides a flowchart of an example method 500 for providing analytics driven update notifications. Method 500 can be implemented by agent 201 and management service 212.

Method 500 includes an act 501 of identifying, by an agent that executes on a managed device and at a polling interval, an application that is currently active at each polling interval. For example, agent 201 can identify, at five second intervals, which application has focus or is in the foreground of managed device 101.

Method 500 includes an act 502 of identifying an active duration for each identified application. For example, agent 201 could determine how long the currently active application has been running and update a previously calculated active duration accordingly or could increment the active duration by a fixed amount.

Method 500 includes an act 503 of reporting each identified application with the corresponding active duration to a management service. For example, agent 201 can generate and send report 300 that includes application usage details and possibly component details to management service 212.

Method 500 includes an act 504 of identifying, by the management service and for at least one of the identified applications, an update that is available for the identified application. For example, management service 212 could send update request 310 to repository server 103 and receive back update response 320 which identifies any available updates for applications listed in update request 310.

Method 500 includes an act 505 of, for each available update, presenting, by the management service and to an administrator, an update notification that includes a recommendation that is based at least partially on the active duration for the corresponding application. For example, management service 212 could employ user interface 211 to present update notifications to an administrator which include recommendations of whether to install updates to applications where the recommendations are based on the active durations reported by agent 201 on one or more of managed devices 101a-101n.

In summary, the present invention provides a way to deploy updates that are relevant to managed devices to avoid consuming resources to update applications and/or components that are unused or infrequently used on the managed devices. Similarly, the present invention also assists an administrator in determining which updates to deploy by presenting update notifications that are driven at least partially on usage-based analytics.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for providing analytics driven update notifications, the method comprising:
  registering, by each of a plurality of agents that executes on a different managed device in a group of managed devices, with a management service that provides management services to the group of managed devices;
  repeatedly calling, by each of the plurality of agents and during a reporting period, an operating-system-provided function at a polling interval to obtain, at each polling interval, an identifier of an application that currently has focus on the corresponding managed device such that the identifier does not identify any application executing in the background;
  compiling, by each of the plurality of agents and using the identifiers, a list of applications that had focus at any of the polling intervals during the reporting period on the corresponding managed device;
  for each application that had focus at any of the polling intervals during the reporting period on the corresponding managed device, identifying an active duration for the application;
  reporting, by each of the plurality of agents and to the management service, the list of applications that had focus at any of the polling intervals during the reporting period on the corresponding managed device along with the corresponding active durations for each application in the list;

generating, by the management service, a combined active duration for each of the identified applications reported by the agents;

for at least one of the applications in the lists reported by the plurality of agents, identifying, by the management service, an update that is available for the corresponding application; and for each available update, ranking the corresponding application based on the combined active duration for the corresponding application that was reported by one or more of the plurality of agents;

presenting, by the management service and to an administrator, an update notification for at least one of the available updates, each update notification including a recommendation that is based on the rankings;

receiving, from the administrator, input that selects at least one update notification;

downloading each selected update; and deploying an update package that includes each selected update to at least some of the managed devices in the group.

2. The method of claim 1, wherein using the identifier to compile a list of applications that had focus at any of the polling intervals during the reporting period comprises using each identifier to obtain a name of the corresponding application, and wherein the list of applications comprises a list of the names of the applications.

3. The method of claim 1, wherein identifying an active duration for each application comprises identifying how long the identified application has been running.

4. The method of claim 1, wherein identifying an active duration for each application comprises determining at how many polling intervals the application was identified as having focus.

5. The method of claim 1, further comprising: for each application in the list, identifying the application as a VDI application or a non-VDI application.

6. The method of claim 1, wherein identifying an active duration for each application comprises adding an increment to the active duration for each polling interval when the application was identified as having focus, the increment being equal to the polling interval.

7. The method of claim 1, wherein deploying the update package that includes each selected update to at least some of the managed devices in the group comprises deploying the update package to less than all of the managed devices in the group.

8. The method of claim 1, wherein deploying the update package that includes each selected update to at least some of the managed devices in the group comprises deploying the update package to all of the managed device in the group.

9. The method of claim 1, wherein reporting the list of applications that had focus at any of the polling intervals during the reporting period along with the corresponding active duration for each application in the list includes reporting one or more of:
operating system details;
hardware details; or
driver details.

10. A method for providing analytics driven update notifications, the method comprising:
registering, by each of a plurality of agents that executes on a different managed device in a group of managed devices, with a management service that provides management services to the group of managed devices;
repeatedly calling, by each of the plurality of agents and during a reporting period, an operating-system-provided function at a polling interval to obtain, at each polling interval, an identifier of an application that currently has focus on the corresponding managed device such that the identifier does not identity any application executing in the background;

compiling, by each of the plurality of agents, a list of applications that had focus at any of the polling intervals during the reporting period on the corresponding managed device;

for each application that had focus at any of the polling intervals during the reporting period on the corresponding managed device, identifying an active duration for the application;

reporting, by each of the plurality of agents and to the management service, the list of applications that had focus at any of the polling intervals during the reporting period along with the corresponding active duration for each application in the list;

receiving, at the management service and from each of the plurality of agents, the report that includes the list of applications that had focus on the corresponding managed device at any of the polling intervals during the reporting period along with the active duration for each application in the list;

generating, by the management service, a combined active duration for each of the identified applications reported by the agents;

based on the reports, generating rankings which reflect how much each of the applications identified in the reports has been used measured by the combined active duration of the identified applications;

determining that an update is available for at least one of the applications identified in the reports;

presenting, to an administrator, an update notification for each update that is available, each update notification including a recommendation that is based on the rankings;

receiving, from the administrator, input that selects at least one update for which an update notification has been presented;

downloading each selected update; and deploying an update package that includes each selected update to at least some of the plurality of managed devices.

11. The method of claim 10, wherein generating rankings comprises, for each of the applications, combining the active duration reported for the application by each of the plurality of agents such that an application with a higher combined active duration is ranked higher than an application with a lower combined active duration.

12. The method of claim 11, wherein the management service is configured to recommend that an update for a particular application be deployed when the combined active duration for the particular application exceeds a threshold.

13. The method of claim 10, wherein the management service structures the update notification as an ordered list of applications for which an update is available, the ordering being based on the rankings.

14. The method of claim 10, wherein identifying an update that is available for the identified application comprises receiving, from a repository server, a location from which the identified update can be downloaded.

15. The method of claim 10, wherein each received report also includes one or more of operating system details, hardware details, or driver details of the corresponding managed device.

16. The method of claim 10, wherein, for each report received from the agents, each application in the list includes an indication of whether the specified application is a VDI application or a non-VDI application.

17. The method of claim 16, wherein the recommendation is also based on whether the corresponding update pertains to a VDI application or a non-VDI application.

18. The method of claim 10, wherein determining that an update is available for at least one of the applications identified in the reports comprises:
sending, to a repository server, a listing of each application that is in any of the lists in the reports after the reporting period.

19. One or more non-transitory computer storage media storing computer executable instructions which when executed by one or more processors implement the following:
an agent that is configured to execute on each of a plurality of managed devices in a group of managed devices, the agent being further configured to perform the following steps while executing on one of the plurality of managed devices to generate and send a report to a management service with which the agent is registered:
repeatedly calling, during a reporting period, an operating-system-provided function at a polling interval to obtain, at each polling interval, an identifier of an application that currently has focus on the managed device such that the identifier does not identify any application executing in the background;
for each identifier that the agent obtains during the reporting period, compiling a list of applications that had focus at any of the polling intervals during the reporting period;
for each application that had focus at any of the polling intervals during the reporting period, identifying an active duration for the application;
reporting, to the management service, the list of applications that had focus at any of the polling intervals during the reporting period along with the corresponding active duration for each application in the list;
the management service that is configured to perform the following steps in response to receiving the report from the agent that is executing on each of the plurality of managed devices:
generate a combined active duration for each of the identified applications reported by the agents;
based on the reports, generating rankings which reflect how much each of the applications identified in the reports has been used measured by the combined active duration of the identified applications;
determining that an update is available for at least one of the applications identified in the reports;
presenting, to an administrator, an update notification for each update that is available, each update notification including a recommendation that is based on the rankings;
receiving, from the administrator, input that selects at least one update for which an update notification has been presented;
downloading each selected update; and
deploying an update package that includes each selected update to at least some of the plurality of managed devices.

20. The computer storage media of claim 19, wherein, for each application in the list, the agent also specifies whether the application is a VDI application or a non-VDI application.

* * * * *